UNITED STATES PATENT OFFICE.

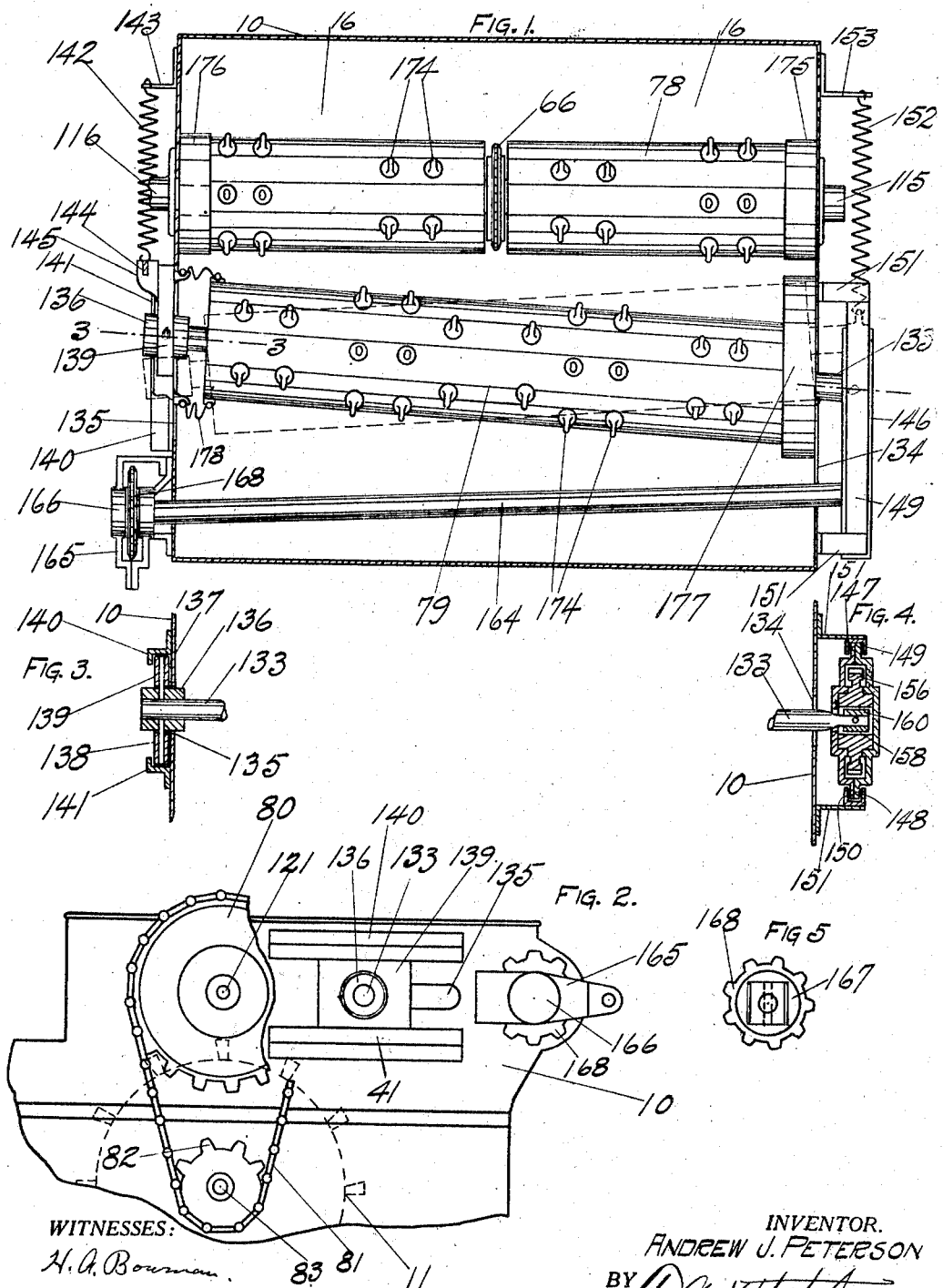

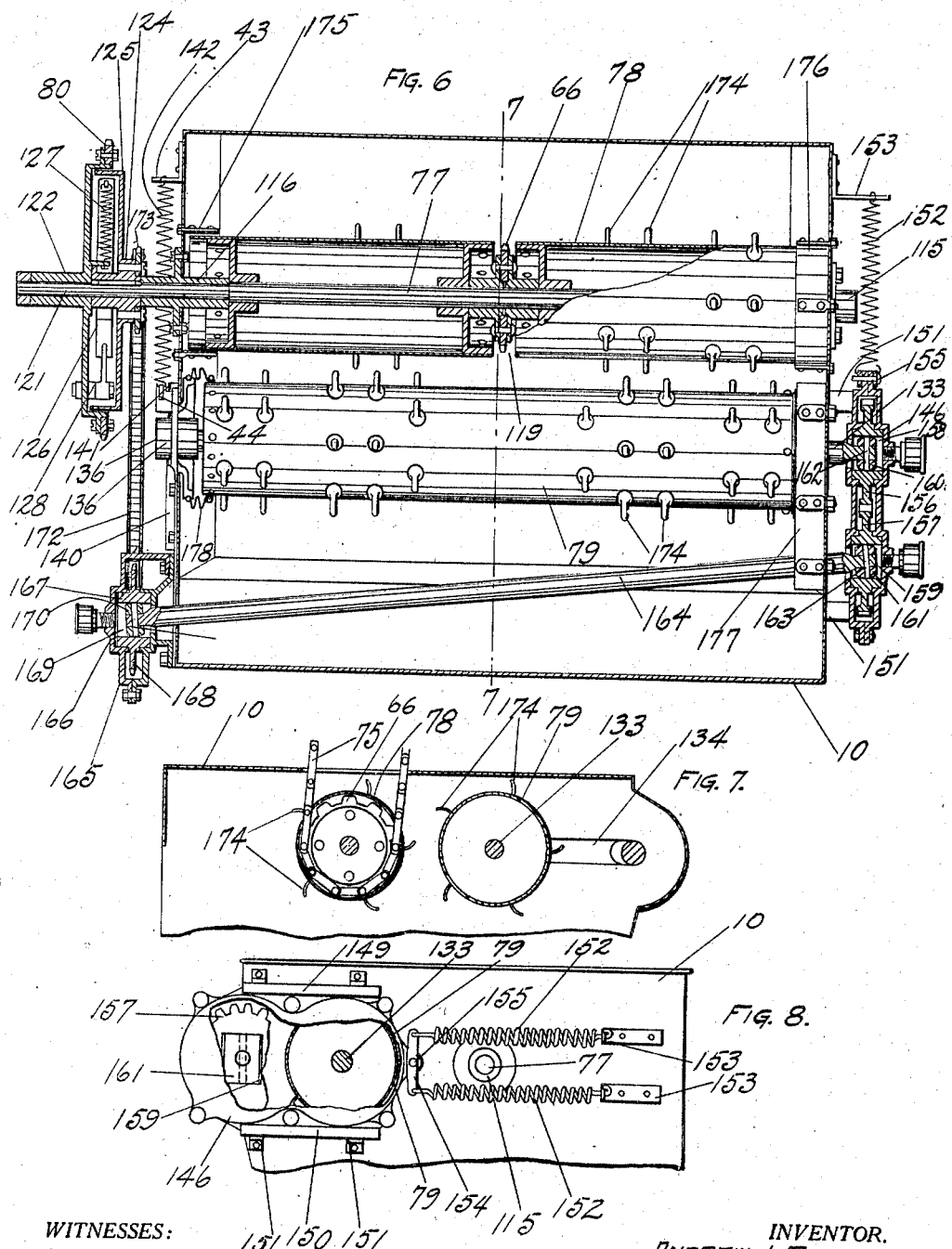

ANDREW J. PETERSON, OF ISANTI, MINNESOTA, ASSIGNOR TO TWIN CITY FEEDER MANUFACTURING COMPANY, OF MINNEAPOLIS, MINNESOTA, A CORPORATION.

FEEDER FOR GRAIN-SEPARATORS.

1,249,663.   Specification of Letters Patent.   Patented Dec. 11, 1917.

Application filed June 12, 1914. Serial No. 844,685.

*To all whom it may concern:*

Be it known that I, ANDREW J. PETERSON, a citizen of the United States, residing at Isanti, in the county of Isanti and State of Minnesota, have invented certain new and useful Improvements in Feeders for Grain-Separators, of which the following is a specification.

My invention relates to feeders for grain separators of the general type described and claimed in my co-pending application, Serial Number 710,858, filed July 22, 1912, and has for its object to provide a pair of positively-driven feed and retarding rollers differentially movable relative to one another and driven at different speeds.

The full objects and advantages of my invention will appear in connection with the detailed description thereof and are particularly pointed out in the claims.

In the drawings, illustrating the application of my invention in one form—

Figure 1 is a top plan view of the feeder mechanism with the casing in section. Fig. 2 is a side elevation with some parts removed or broken away and some shown in dotted lines. Fig. 3 is a sectional view on line 3—3 of Fig. 1. Fig. 4 is a sectional view on line 4—4 of Fig. 1. Fig. 5 is a detail end view of the sprocket wheel shown at the right of Fig. 2. Fig. 6 is a plan view with many elements in section or broken away. Fig. 7 is a transverse sectional view on line 7—7 of Fig. 6. Fig. 8 is a view in elevation of the right end of the parts shown in Fig. 6.

A casing 10 is provided which, as best shown in Fig. 2, is mounted upon the front of the separator above the threshing cylinder indicated in dotted lines at 11.
Journaled in fixed bearings 115 and 116 secured to the sides of casing 10, is a shaft 77 having thereon a roller 78, preferably centrally divided, as indicated at 119, so as to permit the attachment of a central sprocket gear 66 to the shaft 77, which sprocket gear may operate through a sprocket chain 75 other instrumentalities not shown. The shaft 77 has a portion 121 projected outside of casing 10 at one side of the casing. Loose on this extended portion 121 is a sleeve 122 carrying a sprocket wheel 80. A hub 124 is fast on shaft 121 and carries a friction rim 125. Centrifugal shoes 126, normally held inoperative by springs 127, are pivoted, as indicated at 128, to the side disk of sprocket wheel 80. When the said sprocket wheel reaches a speed sufficient so that centrifugal force will overcome the action of these springs, shoes 126 engage the disk 125 and
effect driving connection between sprocket 80 and the shaft 77 in a well-known manner. As shown in Fig. 2, the sprocket 80 is driven by a sprocket chain 81 from a sprocket wheel 82 on the shaft 83 of the threshing cylinder 11. By this means it will be apparent that the roller 78 is positively driven directly from the power shaft of the separator. A complemental roller 79 is carried by a shaft 133, which is so mounted in the casing 10 as to be differentially movable bodily and at each end with respect to roller 78, and yet which is positively driven by the means now to be described.

Slots 134 and 135 are provided in the end walls of the casing 10 through which the shaft 133 extends at either side. As shown in Figs. 1 and 3, a bearing-block 136 is provided for the end of the shaft which extends through slot 135, said bearing-block being pivoted for oscillation in a horizontal plane by means of pins 137 and 138 to a piece 139 slidable in ways 140 and 141 secured to the wall of casing 10 at either side of slot 135. A pair of springs 142, similar to the springs shown in Fig. 8, are connected at one end to brackets 143 on the walls 10 and at the other ends to a cross-piece 144 on a block 145 secured to the piece 139. The springs 142 come on each side of the fixed bearing 116 and serve to hold the bearing block 136 and the shaft 133, and roller 79 carried thereby at that end, in the nearest position relative to roller 78 which the ways 140, 141 will permit. The other end of shaft 133 extends within a casing or housing 146, which is provided with flanges 147, 148 slidable in ways 149, 150 secured to brackets 151 fast on wall of casing 10. A pair of springs 152, similar to springs 142, are connected with brackets 153 fast on the wall of casing 10 and with an equalizer 154 pivotally connected at 155 with an extension of casing 146. The springs 152 normally hold the casing 146 and the shaft 133 and roller 79 at that end as closely to roller 78 as the ways 149 and 150 will permit.

Within bearing extensions of casing 146 are journaled spur gears 156 and 157, which gears, as clearly shown in Fig. 6, are always held in mesh by the aforesaid bearing extensions. Each of the gears 156, 157 is provided with apertures 158, 159, respectively, having flat parallel sides within which are mounted to slide transversely blocks 160, 161, which blocks have flat sides corresponding with the parallel walls of the apertures 158 and 159. As best shown in Fig. 6, the blocks 160, 161 are rounded on their ends within the apertures 158, 159 so that said blocks are free to oscillate in said apertures as well as slide transversely. The block 160 in aperture 158 is directly connected to the end of shaft 133 by means of pin 162. It is apparent, therefore, that shaft 133 is connected with gear 156 so as to be rotated thereby and yet so connected as to permit relative movement of the shaft with respect to said gear. The block 161 is directly connected by means of pin 163 with a shaft 164 extending obliquely across the inside of casing 10 at one side of roller 79, through the side of said casing and into a fixed casing 165 rigidly secured to the outside of the driving end wall of casing 10. The casing 165 comprises a central cylindrical bearing portion 166 within which is journaled the expanded hub 167 of a sprocket wheel 168. The hub 167 has therein a chamber 169 provided with parallel flat side walls within which is a head 170 similar to heads 160 and 161, the head 170 being connected by a pin 171 with shaft 164. It will thus be apparent that shaft 164 is connected with sprocket wheel 168 so as to be driven thereby and yet to be capable of relative movement in respect thereto. The sprocket wheel 168 is positively driven by means of a sprocket chain 172 from a sprocket wheel 173 on the hub 124.

From the above it will be seen that the roller 79 is positively driven through the gearing above described, which is preferably so proportioned that roller 79 will be driven more rapidly than roller 78, roller 78 thus acting as a retarder while roller 79 feeds the grain more rapidly between the rolls and to the threshing cylinder 11. At the same time that the roller 79 is so positively driven, it is, nevertheless, free to move bodily away from roller 78 against the force of springs 152 and 142, and either end may move wholly independently of the other end. It might happen, therefore, that an excessive amount of grain was being fed from one hood and a smaller amount from the other hood, in which case the roller 79 would be moved outwardly at one end but remain in its near position at the other end, as indicated in full lines in Fig. 1. An excess at the other end would result in a change of position, as indicated in dotted lines in the same figure. The roller 79 is, therefore, flexibly and yieldingly held in position with reference to roller 79 and a perfect self-adjusting feed and retardation of the grain results therefrom. Each of rollers 78 and 79 is provided with curved teeth 174, the teeth on roller 78 being curved backwardly from the direction of rotation, while the teeth on roller 79 are curved forwardly, as shown in Fig. 7.

The ends of roller 78 are protected by fixed guards or caps 175, 176 by which straw and grain are prevented from getting into the bearings of said roller. The ends of roller 79 may be similarly protected by elongated caps 177, as shown at the right of Figs. 1 and 6, along which the end of the roller may slide, as there indicated, or a flexible and extensible spring metal closure 178 may be employed, as indicated at the left of said figures.

The operation of my feeding means has been fully given in connection with the detailed description thereof. As designed to be used by me, the bundles descend vertically through the apertures or throats of the hoods 16 and are passed between rollers 78 and 79 to threshing cylinder 11. The pins or teeth 174 on roller 78, extending in reverse direction from the direction of movement of and moving faster than the pins on roller 79, push the grain downwardly in a relatively fixed plane to the threshing cylinder below, while the pins on roller 79, moving at a slower rate of speed than those on roller 78, act to retard or hold back the outer portion of the bundle so that the grain may be fed in a continuous and substantially equal sheet. The contacting of curved pins 174 with the grain in their relative movement with respect to that of the grain is on the curved side of said pins in each roll. This prevents any chance of clogging or slugging between the feed rollers due to wet or tangled grain, which can always slide off of the pins of roller 79, while faster moving pins of roller 78 will readily pass out of the grain at the turn.

I claim:

1. In combination with a casing, a chain driven feed roller having its shaft journaled in fixed bearings on said casing, a pair of flat parallel guides on each side of the casing, blocks slidable between each pair of guides in a plane containing the axis of said fixed roller in directions transverse or parallel to said axis, a pair of meshing gears in one of said blocks, a second roller having one end of its shaft universally connected to and journaled by one of said gears in said block and the other end universally connected and journaled in the other of said blocks, springs attached to said blocks for normally holding said second roller in parallel relation to said first roller, a fixed bearing on said casing, a driving gear rotating in said bearing, a shaft universally connected to and journaled by said last-named gear and said second meshing gear of said block and extending obliquely across the casing for independently driving said second roller and permitting parallel or angular movement of said second roller away from said first roller.

2. In combination with a casing, a feed roller having its shaft journaled in fixed bearings on said casing, a pair of slidable blocks carried by the casing, a second roller having its shaft journaled at its ends in said slidable blocks and normally held thereby in parallel relation to the first roller, means for positively driving the first-named roller, gears carried by one of said blocks for independently driving the second roller, a constantly-driven gear, and a shaft operatively connecting said gear with one of the block gears and having sliding joints in said gears so that the second roller will be positively driven when the same is in or being moved to any of its possible angular or parallel positions relative to the first roller.

3. In combination with a casing, a feed roller having its shaft journaled in fixed bearings on said casing, a pair of slidable blocks carried by the casing, a second roller having its shaft journaled at its ends in said slidable blocks and normally held thereby in parallel relation to the first roller, means for positively driving the first-named roller, gears carried by one of said blocks including a gear having parallel walled central cavities, a constantly-driven gear on the casing having parallel walled central cavities, and a shaft having secured to the ends thereof parallel walled blocks slidably positioned in said cavities whereby the second roller is positively driven when the same is in or being moved to any of its possible angular or parallel positions relative to the first roller.

4. In combination with a casing, a feed roller having its shaft journaled in fixed bearings on said casing, a pair of slidable blocks carried by the casing, a second roller having its shaft journaled at its ends in said slidable blocks and normally held thereby in parallel relation to the first roller, means for positively driving the first-named roller, gears carried by one of said blocks for independently driving the second roller, means for obtaining a flexible connection for operating said gear, and springs connected to the casing and to each of said slidable blocks, respectively, for holding the second roller in said parallel relation and yet free to move independently at either end relative to the fixed roller.

5. In combination with a casing, a feed roller having its shaft journaled in fixed bearings on said casing, a pair of slidable blocks carried by the casing, a second roller having its shaft journaled at its ends in said slidable blocks and normally held thereby in parallel relation to the first roller, means for positively driving the first-named roller, gears carried by one of said blocks for independently driving the second roller, a constantly-driven gear, and a shaft operatively connecting said gear with one of the block gears and having sliding joints in said gears so that the second roller will be positively driven when the same is in or being moved to any of its possible angular or parallel positions relative to the first roller, said shaft normally extending between said sets of gearing in an oblique direction with respect to the axis of the fixed roller.

6. In combination with a casing, a pair of slides on said casing, a feed roller having its shaft journaled in fixed bearings on said casing, a shaft extending across said slides and having universal connection at one end with a fixed driving device, a pair of blocks slidably mounted in said slides, a feed roller universally journaled in said sliding blocks and adapted to move to or from said fixed roller at either or both ends, means supported by one of said blocks for universally driving said second-named roller from said shaft, and means for independently driving said first-named roller.

In testimony whereof I affix my signature in presence of two witnesses.

ANDREW J. PETERSON.

Witnesses:
W. A. LAMB,
H. A. BOWMAN.